UNITED STATES PATENT OFFICE 2,537,644

POLYSTYRENE EMULSION IN FORMAMIDE, PREPARATION THEREOF AND PROCESS OF COATING THEREWITH

Edward L. Carr, Akron, Ohio, assignor to The Firestone Tire & Rubber Company, Akron, Ohio, a corporation of Ohio No Drawing. Application April 12, 1949, Serial No. 87,107

6 Claims. (Cl. 260—32.6)

This invention relates to novel liquid polystyrene coating, impregnating and like compositions comprising polystyrene emulsified in formamide, and to the process of preparing and using such compositions.

Polystyrene has heretofore been dissolved in volatile organic solvents to provide liquid coating, impregnating and other similar compositions. Such compositions, of course, entail the cost, hazard and complications attendant upon the use of volatile organic solvents. Moreover, the practical concentration of polystyrene in such solutions is limited by the necessity for keeping the viscosity sufficiently low for handling. There have also been prepared aqueous dispersions or latices of polystyrene which might conceivably be used as coating and impregnating media. However, such latices merely dry to a powdery condition, and do not form continuous films, coatings or indurations.

Accordingly, it is an object of this invention to provide novel liquid coating compositions having a polystyrene base but being free of organic solvents.

Another object is to provide such compositions which will dry to form continuous films.

A further object is to provide such compositions in which the concentration of polystyrene may be made relatively large without unduly increasing the viscosity thereof.

A still further object is to provide such compositions in which the liquid vehicle is non-inflammable, non-toxic, and relatively low in cost.

SYNOPSIS OF THE INVENTION

The above and other objects are secured, in accordance with this invention, in novel emulsions or dispersions of minute particles of polystyrene in a liquid medium comprising essentially formamide. Such dispersions are prepared, in accordance with this invention, by emulsifying monomeric styrene in formamide. Polymerization influences are then brought to bear, and the styrene becomes polymerized in the form of extremely minute particles emulsified in the formamide medium. The resultant emulsion is quite fluid and may be employed as a coating and impregnating composition on a wide variety of materials. When dried under heat to evaporate the formamide, the coatings and impregnations become homogeneous, clear and continuous.

THE PROCESS OF POLYMERIZATION

It has been discovered by this invention that styrene will polymerize in emulsion in formamide in a manner very similar to the manner in which it polymerizes in emulsion in water. The monomeric styrene is emulsified by agitation in the formamide, in the presence of a small percentage (say 0.4 to 2.5% based on the weight of formamide) of an emulsifier. The styrene may comprise from about 10% to about 50% of the entire mixture by weight. In general suitable emulsifiers comprise a hydrocarbon group containing from 8 to about 22 carbon atoms and a hydrophilic group such as an alkali metal sulfate or sulfonate group, an alkali metal carboxylate group, an amine hydrochloride group or the like. Typical emulsifying agents include for instance the alkali metal soaps of the higher fatty acids such as sodium oleate, sodium laurate, potassium stearate and the like; alkali metal alkali sulfates such as sodium lauryl sulfate, sodium sulfates of the mixed alcohols produced by hydrogenation of the fatty acids contained in coconut and other natural glyceride oils, and the like; sodium alkyl sulfonates, such as the salts of alkyl sulfonic acids produced by sulfonation of hydrocarbon fractions containing from 10 to 20 carbon atoms; alkali metal salts of aryl, and alkylated aryl, sulfonic acids; alkali metal salts of sulfonated $\alpha$-$\beta$ dicarboxylic acid diesters such as sodium dioctyl sulfosuccinate and other similar products; alkali metal salts of monosulfated monoglycerides of higher fatty acids containing 8–22 carbon atoms; the compounds containing short hydrocarbon chains containing an alkali sulfate group, which chains are linked to a hydrocarbon chain containing 8 to 22 carbon atoms by an ester, amide, or ether linkage, such as sodium oleyl taurine, the sodium salt of the monoester of ethylene glycol with oleic acid; and cationic emulsifiers such as the salts of higher fatty primary, secondary and tertiary amines containing 8 to 22 carbon atom chains, such as dodecylamine hydrochloride. Instead of a single one of the emulsifiers set forth above, a mixture of two or more of these emulsifiers may be employed, provided that the cationic amine emulsifiers are not employed cojointly with the anionic type.

The polymerization of the emulsified styrene may be initiated by any of the usual free-radical generating catalysts or agencies employed in aqueous emulsion polymerization, such as oxygen yielding compounds on the order of hydrogen peroxide, acetyl peroxide, benzoyl peroxide, di-t-butyl peroxide, and persalts on the order of the alkali and alkaline-earth metal persulfates, perborates, percarbonates and the like. The use of from about 0.1% to 2.0% of these catalysts, based on the weight of styrene in the polymerization mass, will generally provide a sufficient supply of free radicals to effect a reasonable rate of polymerization. In addition, there may be employed physical means for generating free radicals such as ultraviolet light irradiation, ultrasonic vibration and ultra-high-frequency electrical waves. The temperature of the polymerization may be varied from the freezing point of the formamide polymerization medium (this may be depressed below the freezing point, 2.5° C., of pure formamide by addition of suitable antifreeze agents as set forth hereinbelow) to the boiling point of the styrene under the pressure reigning in the reaction vessel. Generally, temperatures in the range 40° to 100° C. will be preferred. The application of higher temperatures, say from 80° to 180° C. will effect thermal generation of free radicals and consequent polymerization of the styrene without the aid of special catalysts.

As noted above, the polymerization medium of this invention comprises essentially formamide. However, the formamide may be diluted with other polar liquids miscible therewith such as water, glycerol, ethylene glycol, etc., in which case the resultant products, provided that the polymerization medium contains at least 75% of formamide by weight, will have most of the advantages of the products produced with undiluted formamide. Such dilution may be desired for antifreeze purposes, as when the polymerization is to be carried out at low temperatures, or for the purpose of cheapening the polymerization medium. The polymerization medium may also contain small proportions, say up to 4 or 5%, of miscellaneous ingredients such as salts, buffering agents, modifiers, etc.

PROPERTIES AND USES OF THE LIQUID COMPOSITIONS

The products produced by polymerization as above described are liquid, free-flowing emulsions of finely divided particles of polystyrene dispersed in formamide. The size of these particles is extremely small, usually ranging from about 0.5 to 6 microns in diameter. These compositions may be spread as coatings upon various surfaces, or used to impregnate porous bodies. When dried under sufficient heat (say 150° C. to 190° C.) to evaporate the formamide, the compositions form a continuous polystyrene phase—i. e. a smooth, clear, adherent coating in those cases where the composition is employed as a coating, or a monolithic induration where the composition is employed for impregnation purposes. This is in contrast to the behavior of polystyrene emulsions in water which, when dried under heat, yield merely powdered, or at most sintered, polystyrene. Accordingly, the compositions of this invention may be used to provide smooth, adherent coatings of polystyrene upon a wide variety of surfaces such as the common structural metals on the order of iron, simple carbon steels, aluminum, Duralumin, copper, brass and the like, cotton, wood, textile fabrics (particularly for lamination), paper, fiber-board, porcelain and many other materials.

The compositions may also have dispersed therein various auxiliary agents such as coloring pigments, antioxidants, conductive pigments and the like. Such materials will usually be incorporated by emulsifying them in the mixture by means of emulsifying agents.

With the foregoing general discussion in mind, there are given herewith detailed examples of the practice of this invention.

I. Preparation of polystyrene emulsion

|  | Parts |
|---|---|
| Styrene | 100 |
| Formamide | 180 |
| Sodium lauryl sulfate | 5 |
| Potassium persulfate | 100 |

The above ingredients were charged into a closed reaction vessel provided with agitating means. The free space in the vessel was swept out with nitrogen, the vessel closed, agitation commenced, and the temperature adjusted to 50° C., which agitation and temperature were maintained for 18 hours, at the end of which time polymerization appeared to be complete. The reacted charge was constituted of a flowable emulsion, in the formamide, of extremely finely divided particles of polystyrene having a diameter of 1–3 microns on an average.

Example II.—Process of coating

The emulsion of polystyrene prepared as just described in formamide was brushed onto specimens of the following materials, and dried under infra-red baking lamps for 15 minutes.

| | |
|---|---|
| Tin plated steel | Ingot iron sheet |
| Tin plate stock | Galvanized steel sheet |
| Aluminum | Brass |
| Duralumin | Bronze copper |
| Magnesium | Wood (ponderosa pine) |
| Copper | Porcelain |
| Cast iron | Paper |
| Steel | Unbleached muslin |

A smooth, hard, adherent film was obtained in each case. In the case of the copper, cast iron, steel, ingot iron, brass, bronze and copper sheets, a slight discoloration occurred. The coatings withstood 5 minutes' exposure to boiling water without detriment.

From the foregoing general discussion and detailed specific examples, it will be evident that this invention provides novel fluid coating and indurating compositions based on polystyrene. The liquid medium, formamide, is non-explosive and odorless, and is, moreover cheaply and abundantly available. The process of preparing and applying the composition is relatively simple and may be carried out with a minimum of technical supervision.

What is claimed is:

1. Process which comprises polymerizing styrene in emulsion in formamide, the styrene constituting from 10% to 50% of the emulsion by weight.

2. Process which comprises polymerizing styrene in emulsion in formamide at temperatures between 40° C. and 100° C., the styrene comprising from 10% to 50% of the emulsion by weight.

3. Process which comprises polymerizing styrene in emulsion in formamide at temperatures between 40° C. and 100° C., the styrene constituting from 10% to 50% of the emulsion by weight, and the polymerization being catalysed by the presence in the reaction mass of an alkali metal persulfate.

4. A liquid composition comprising polystyrene particles emulsified in formamide, the polystyrene constituting from 10% to 50% of the emulsion by weight.

5. A liquid composition comprising polystyrene emulsified in formamide, the polystyrene constituting from 10% to 50% by weight of the styrene, and the emulsion being stabilized by the presence therein of an alkali metal alkyl sulfate.

6. Process which comprises applying to a solid substrate a coating of an emulsion of polystyrene in formamide, the polystyrene constituting from 10% to 50% of the emulsion, and drying said coating at temperatures between 150° and 190° C.

EDWARD L. CARR.

REFERENCES CITED

The following references are of record in the file of this patent:

UNITED STATES PATENTS

| Number | Name | Date |
|---|---|---|
| 2,015,103 | Dreyfus et al. | Sept. 24, 1935 |
| 2,080,558 | Carothers | May 18, 1937 |
| 2,161,481 | Marks | June 6, 1939 |
| 2,137,393 | Dorough et al. | Nov. 22, 1939 |